United States Patent [19]

Meyer et al.

[11] Patent Number: 4,507,871
[45] Date of Patent: Apr. 2, 1985

[54] QUICK ATTACH RETAINER FOR EXTENSOMETER

[75] Inventors: Richard A. Meyer, Carver; Harry R. Meline, Minnetonka, both of Minn.

[73] Assignee: MTS Systems Corporation, Eden Prairie, Minn.

[21] Appl. No.: 491,865

[22] Filed: May 5, 1983

[51] Int. Cl.$^3$ .............................................. G01N 3/04
[52] U.S. Cl. ................................... 33/148 D; 73/856
[58] Field of Search ....................... 33/148 D, 147 D; 73/856, 860

[56] References Cited

U.S. PATENT DOCUMENTS

| | | | |
|---|---|---|---|
| 2,099,896 | 11/1937 | Kinzel | 33/148 D |
| 2,588,630 | 3/1952 | Jackman | 33/148 D |
| 2,611,966 | 9/1952 | Rebman | 33/148 D |
| 3,319,338 | 5/1967 | De Nicola | 33/148 D |

*Primary Examiner*—William D. Martin, Jr.
*Attorney, Agent, or Firm*—Kinney & Lange

[57] ABSTRACT

A quick attach spring retainer holds an extensometer arm onto a test specimen under a resilient load using a unitary spring that is quickly placed onto an extensometer, and which has low mass to minimize any effects on dynamic testing. The spring force is reacted so that it creates a very low disturbing moment on the specimen and extensometer in that this clamping force is applied directly diametrically across from the specimen engaging edge of the extensometer. The unit is made so that it is very stable by providing a three point contact with the spring and the specimen engaging edge. The attachment clip or spring is adjustable across a range of different specimen sizes, using the same type of fixtures, and is made to be a self contained assembly that is not easily lost or misplaced because there are no loose parts. The spring that is utilized is retained in a mounting bracket that is used for attachment.

17 Claims, 2 Drawing Figures

QUICK ATTACH RETAINER FOR EXTENSOMETER

BACKGROUND OF THE INVENTION

1. Field of the Invention

The present invention relates to spring clips for attaching extensometers to specimens quickly and easily.

2. Description of the Prior Art

In the prior art, various methods of attaching extensometers to specimens have been advanced including rubber bands that are used for clipping extensometers directly to the specimen. Normally, extensometers carry some type of a specimen engaging point or knife edge that rests against the specimen under resilient load and when the test specimen is subjected to axial force, in particular, the extensometer arms will either tend to separate or move together as long as the knife edges or specimen contacting edges are kept against the specimen.

The Model 632.11 Axial Extensometer sold by MTS Sytems Corporation, Eden Prairie, Minn., is a typical extensometer using knife edges which engage the specimen, and in one form, namely the model 632.11B/C-45, which is a water cooled extensometer for high temperature chambers, a latch type clip is utilized for holding the extensometer on the specimen. This clip is a pivoting, relatively rigid wire, that is independently loaded with a coil spring mounted on the extensometer arms so that the knife edge on each extensometer arm is urged against the specimen when the latch is held in place by the force from a separate spring. The spring load for urging the knife edge against the specimen, is thus provided by a spring separate from the relatively rigid contact arm or clip that is used for attachment.

The clip is a multiple part assembly, and one of the problems that has arisen is making sure that the effective application line of the spring load against the knife edge is on a plane that passes through the axis of the specimen so that there isn't any moment or eccentric loading on the extensometer knife edges.

SUMMARY OF THE INVENTION

The present invention relates to a prebent wire spring clip for attaching extensometer arms onto a test specimen. The spring clip is a single bent wire having a shank for mounting, a spring section of sufficient length to provide the necessary loading for specimen operation, and a specimen engaging clip portion that provides a load reaction on the opposite side of the specimen from the extensometer arm, to urge the specimen engaging means, such as a knife edge against the specimen under very stable spring loads.

The clip shank is mounted in a mounting block that can easily be placed onto existing extensometers arms, and actually is also used for holding the specimen knife edge onto the extensometer arm, (in the preferred form) to permit quick adaptation to existing extensometers, as well as very reliable operation.

The mounting arrangement is made to minimize any friction between the spring clip and its mounting, and it is made with relatively low mass for less effect on dynamic testing. The unit is self-contained, easily used, and provides for stable attachment of extensometers to test specmens, quickly, reliably and easily.

DETAILED DESCRIPTION OF THE PREFERRED EMBODIMENTS

Figure 1:
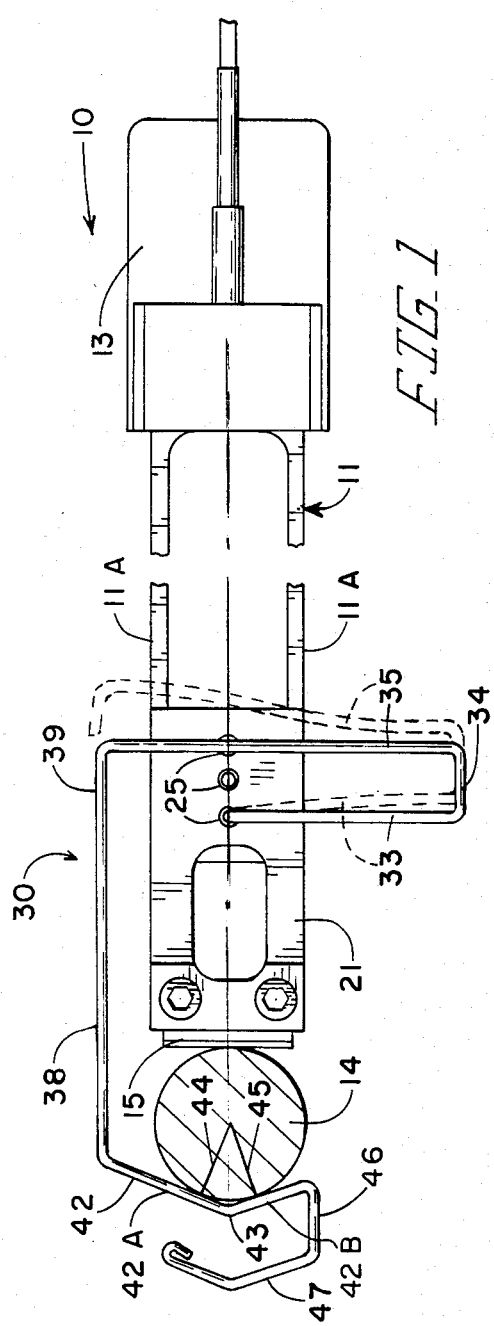
FIG. 1 is a top plan view of an extensometer having a quick attach spring retainer made according to the present invention holding the extensometer onto a test specimen.

As shown in FIG. 1, an extensometer indicated generally at 10 includes an upper arm assembly 11, and a lower arm assembly 12 which are connected together inside a housing indicated at 13, substantially in the manner shown in U.S. Pat. No. 3,789,508, utilizing cross flexure elements for supporting the arms together. Specifically, the extensometer shown herein is a Model 632.12 Axial Extensometer made by MTS Systems Corporation of Eden Prairie, Minn. The arm assemblies 11 and 12, as shown, each include a pair of parallel arm straps 11A and 12A, respectively, and have ends indicted at 11B and 12B, respectively, that are adjacent a specimen 14 that is to be tested for axial elongation. The specimen 14 is mounted in a suitable test machine. The extensometer arm 11 is provided with an upper specimen engaging means comprising a knife edge 15, and arm 12 is provided with specimen engaging means comprising a lower knife edge 16 in a conventional manner.

The knife edges 15 and 16 are seated in shouldered recesses on the outer ends of the arms 11 and 12, respectively, and are held in place with quick attach retainer assemblies indicated generally at 20 which are made according to the present invention. Each quick attach retainer assembly includes a fastener plate 21 that rests on the top edges of the respective arms 11 and 12, and which has a lug or block 22 at the end thereof adjacent the specimen through which cap screws 23 extend and which thread into portions of the respective arms 11 and 12 to not only securely clamp the plates 21 in place, but also to securely hold the respective knife edges 15 and 16 clamped against their respective mounting arms.

This is important in that the quick attach spring retainers of the present invention therefore can be used on standard extensometers by merely replacing the existing knife edge retainer plates that are used for attaching the knife edges to the respective arms.

Figure 2:
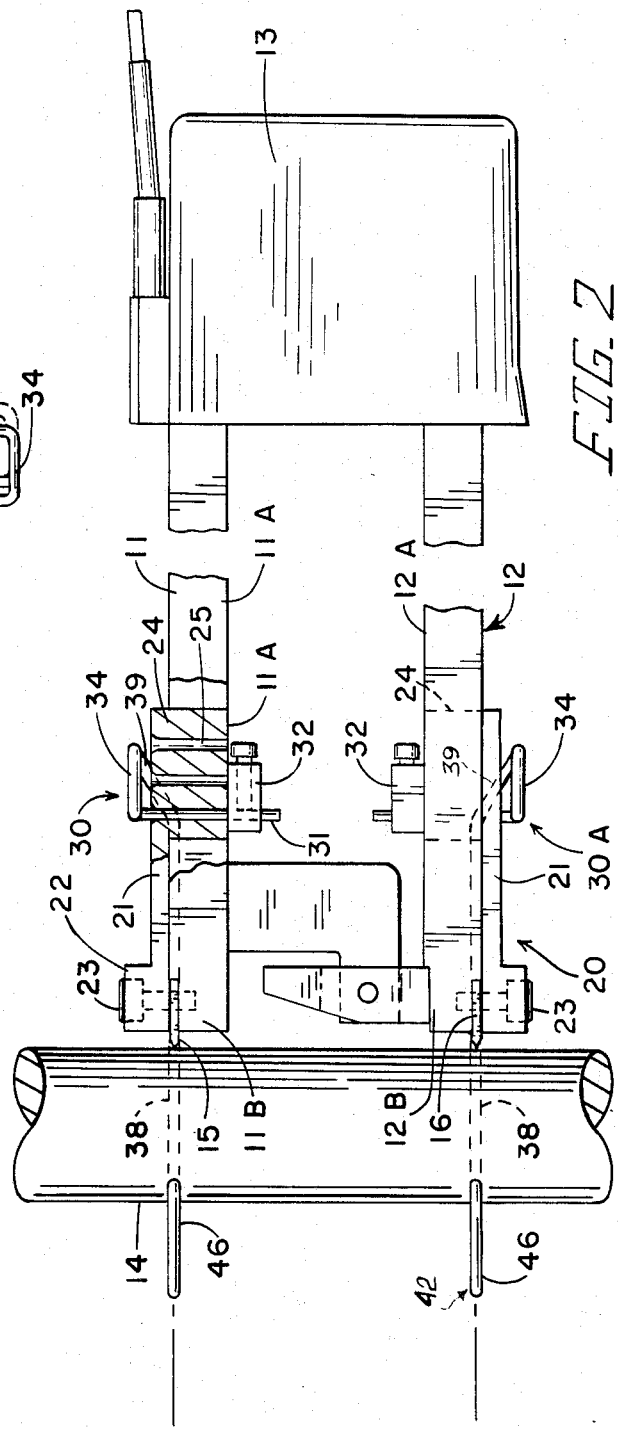
FIG. 2 is a side elevational view of the device of FIG. 1.

Each of the mounting plates 21 extends along the respective extensometer arm and a hub or housing 24 extends from each of the plates 21 down in between the respective arm segments 11A, 11A, and 12A, 12A, as shown in FIG. 2. The hubs 24 have a plurality of apertures 25 drilled therethrough as shown. These apertures 25 are centered between the arm segments 11A, 11A and thus are on the bisecting plane of the extensometer arms which also intersects the longitudinal axis of specimen 14.

A prebent spring retainer clip comprising a unitary bent spring wire is provided to exert the required spring load for holding the knife edges 15 and 16 against the specimen 14. Spring clip 30 has a pivot shank portion 31 that is held in one of the apertures 25 in the respective hub 24, and which is pivotally held in such aperture through the use of a set screw collar 32 on the free end of the shank 31. The set screw collars are adjusted so that there is very little longitudinal movement of the shank 31 permitted, but the shank is free to rotate in the aperture. The upper spring 30 on arm 11 and spring 30A on the arm 12 as shown in FIG. 2 are mirror images, or "right" and "left" bends, so that the closed bend end of the springs, as will be explained, extend out from the same side of the extensometer when in use.

The springs 30 and 30A in addition to the shanks 31 are integrally formed into a U shaped spring section including first spring leg 33 that is prebent to a shape indicated by the dotted lines in FIG. 1, and which extends laterally from the respective arm when it is in position as shown, an internal base 34 which forms a junction between the first spring arm 33 and a second longer spring arm 35, spring arm 35 extends all the way back across the extensometer arm to which it is mounted, and then the spring arm 35 joins a connecting leg or link 38 at a bend portion 39. The spring arm 35 is also prebent under its free unloaded state as shown in dotted lines in FIG. 1. While the central axes of spring arms 33 and 35 are prebent they also lie substantially in a plane that is perpendicular to the axis of specimen 14. The connecting leg 38 extends at right angle to arm 35 as shown in FIG. 1. The bend portion 39 is bent as shown in FIG. 2 so that the legs 38 of the respective spring clips 30 and 30A lie along the plane of the knife edges 15 and 16 which is perpendicular to the axis of the specimen as shown in FIG. 2. The legs 38 extend from the longer spring arm 35 of the "U" shaped spring portions in the direction as the first arm 33 is located. Thus, the leg or link 38 is generally parallel to base 34.

The wire is then bent to form a specimen engaging clip section 42 which forms a shallow gentle V bend 43 that aligns with the central plane of the arms 11 and 12 which also lies along the axis of the test specimen 14. The clip section 42 includes two straight lengths of wire 42A and 42B which contact the test specimen 14 at two tangent points where the radius lines indicated at 44 and 45 in FIG. 1 intersect the specimen surface.

The spring free end is then bent around with a base section 46, and a grip member 47 that folds back to generally conform to the formation of the attaching clip sections 42.

It thus can be seen that the springs 30 or 30A each include a mounting shank for pivotal mounting to plates 21 so that the plane formed by the U shaped spring arms 33 and 35 and base 34 is parallel to the plane of the extensometer arms perpendicular to the axis of the specimen 14.

The spring arms 33 and 35 are prebent for proper spring loading as shown in dotted lines in FIG. 1, so that the arms 33 and 35 become straight and parallel when they are under load as the springs hold the extensometer arms to the specimen. The leg 38 is bent so that the spring force acting on the specimen to hold the extensometer is generally along the central plane of the respective knife edges 15 and 16 which is perpendicular to the axis of the specimen. Further, because there is three point contact with the specimen including a point of contact at the respective knife edge and the two points at the ends to radius lines 44 and 45 for each clip, the individual knife edges are very stably supported. There is no tendency to be uneven or rock in the mounting. The knife edges define a line and will contact the specimen at a point. Cone end contact pins also may be used for mounting the extensometer to the specimen.

The collars 32 securely hold the springs in position on the mounting plates without causing any undue friction. This provides for smooth and easy engagement and disengagement of the extensometer to the specimen.

The active spring section or spring arm means does not have to be "U" shaped arms as shown. The operable spring arm length must be enough to accommodate the bending necessary for movement of the clip portion to place it around the specimen being tested without overstressing the spring arm means. The active spring section can be arm means formed circularly, folded back and forth laterally more than once, or spiralled. The leg leading from the spring arm means section (the "U" shaped section as shown) is bent down to load the clip section along the plane perpendicular to the specimen axis and lying on the knife edge for that extensometer arm. It is desirable to have the effective point of force reaction between the pivot shank 31 and the block also lie on this same plane. However, the leg 38 is long and the U shaped spring arm sections easily move in torsion and thus movement of the clip 42 in direction along the axis of the specimen does not cause high spring loads. Thus, while the effective application of load on the pivot shank 31 is desirably exactly along the plane of the knife edge for the arm, loading generally or substantially along such plane is satisfactory.

Further, the leg 38 can be bent so that the spring forces exerted between the clip section 42 on one side of the specimen and the pivot shank 31 position on the other side of the specimen are balanced at the knife edge and the net result is that the net force exerted by the spring on the knife edge acts along the plane perpendicular to the axis of the specimen passing through the knife edge to minimize being induced into the extensometer. Bending induced by the attachment spring may create inaccuracies in measurements.

A further important point, however, is that the pivot axis for mounting the spring parallel to the specimen axis is on the plane passing through the specimen axis and bisecting the extensometer arm mounting the spring to insure there are no moments tending to rotate the extensometer arm about the specimen axis.

Although the present invention has been described with reference to preferred embodiments, workers skilled in the art will recognize that changes may be made in form and detail without departing from the spirit and scope of the invention.

What is claimed is:

1. A spring clip for coupling an extensometer arm to a speciman to be tested with the extensometer arm extending generally laterally from the specimen and engaging a surface of the specimen on one side;

said clip comprising:

a continuous bent spring wire having a formed spring section comprising a pair of spaced spring legs joined at first ends thereof and defining a first plane;

means at a second end of a first leg of the spring section for pivotally mounting the spring section about a pivot axis perpendicular to the first plane, a second plane being defined by the pivot axis perpendicular to the first plane and to the axis of said first leg;

a second end of the second leg of the spring section extending laterally from the means to pivotally mount in opposite direction from the first end beyond the second plane;

a link leg joining the second leg of the spring section and extending generally parallel to the second plane in direction toward the means for pivotally mounting and said second leg extending in such direction substantially beyond the means for pivotally mounting; and a spring force reaction member joined to the opposite end of the link leg from the second leg and extending laterally of the link leg through the second plane to define a space between the means for pivotally mounting and the spring force reaction member, to engage a specimen positioned between the spring force reaction member and the means for pivotally mounted and being of size to exert a force when the spring force reaction member is engaged with such specimen and the means for pivotally mounting is mounted on an extensometer so that the spring section resiliently resists separation of the means for pivotally mounting and the spring force reaction member.

2. A spring clip bent from a spring wire and forming a shaped spring portion for coupling an extensometer arm to a specimen and comprising:

spring arm means formed from the spring wire;

a pivot shank formed from the spring wire at one end of the spring arm means;

a link leg formed from the spring wire and joined to the spring arm means at a second end thereof and extending in direction generally perpendicular to the pivot shank and being spaced laterally from the pivot shank, at least a portion of the spring arm means extending from the link leg to the opposite side of the pivot shank so that when the pivot shank is retained and a tension load is placed on the link leg, the spring arm means will resiliently bend;

a clip section formed from the spring wire and joining the link leg, said clip section extending laterally from the link leg in substantially the same direction as the direction of location of the pivot shank from the link leg, said clip section forming a spring reaction member to exert spring forces between the pivot shank and the clip section, said clip section being configured to engage a specimen on a side of such specimen opposite from the pivot shank and the spring arm means bending as the clip section and pivot shank are separated to exert a resilient force to urge an extensometer arm mounting the spring arm means toward such specimen.

3. The apparatus of claim 2 and a plate pivotally mounting said pivot shank, and means on the plate to attach it to the arm of an extensometer, the clip section being configured to engage a specimen with which said extensometer is to be used on a side of such specimen opposite from such extensometer arm, at two points of contact symmetrical with respect to a plane passing through the axis of such specimen and bisecting such extensometer arm.

4. The spring clip of claim 2 wherein a portion of the link leg is bent to position the clip section on such specimen to exert force to urge an extensometer arm mounting the pivot shank toward such specimen along a plane perpendicular to the axis of the specimen and passing through the point of contact of the extensometer arm and such specimen.

5. The spring clip of claim 3 wherein the clip is for use with an extensometer arm having a knife edge member mounted on such extensometer arm for engaging a specimen, said plate including means for attaching the plate to an extensometer arm and including means to retain the knife edge member on such extensometer arm.

6. A spring clip mounting device for attaching extensometers to test specimens, such extensometers having extensometer arms that extend generally perpendicular to the axis of a specimen to be tested and which arms have specimen engaging means on an end of each arm engaging the specimen under spring load comprising a spring clip which exerts a resilient force urging such specimen engaging means against a specimen, said spring clip including:

a generally U shaped bend section having a pair of spring arms and a base joining said spring means, said spring arms extending in the same direction from said base;

a first of said spring arms having means to pivotally mount the first spring arm to a respective extensometer arm on which the spring clip is used, with the spring arms defining a plane generally parallel to the central plane of such extensometer arm which is perpendicular to the axis of a specimen to which the arm is to be attached;

a second of said spring extensometer arms extending away from said base a greater distance than the first spring arm, the second spring arm having a free end extending to an opposite side of an extensometer arm on which the spring clip is to be mounted from the base of said U shaped bend section, both of said spring arms being on the same side of a specimen to which the extensometer arm is to be attached;

a clip section defining a V and configured to be mounted on an opposite side of such specimen from the spring arms; and a connecting link leg generally perpendicular to the spring arms positioned along one side of such specimen and joining the clip section to the free end of said second spring arm, said spring arms bending to be under resilient load urging an extensometer arm on which the spring clip is used toward a specimen on which such extensometer arm is to be mounted so that the specimen engaging means of such extensometer arm engages such specimen when the clip section is placed on an opposite side of such specimen from such specimen engaging means, the spring load thereby being exerted through the clip section against the specimen on an opposite side from the specimen engaging means.

7. The apparatus of claim 6 wherein said spring arms are prebent into a shape other than straight and are positioned on an extensometer arm with which the spring clip is used so that when such extensometer arm is in position on a specimen, the spring arms are substantially parallel to each other.

8. The apparatus as specified in claim 6 wherein the means to pivotally attach the first spring arms to an extensometer arm comprises a shank generally perpendicular to the plane defined by the spring arms, and means for pivotally mounting said shank to an extensometer arm.

9. The apparatus as specified in claim 8 wherein said means for pivotally mounting comprises a mounting plate having a hub for receiving said shank, said mounting plate being adapted to be fixedly attached to an extensometer arm, and having a portion to hold specimen engaging means onto such extensometer arm.

10. The apparatus of claim 9 wherein the spring clip is formed and mounted to provide force urging an extensometer arm on which the spring clip is used toward a specimen essentially along a plane perpendicular to the axis of such specimen and passing though the contact point between such extensometer arm and specimen to minimize bending induced into such extensometer arm.

11. The apparatus as specified in claim 9 wherein each such extensometer arm engages the associated specimen substantially at a point lying in a plane perpendicular to the axis of the specimen, and said link leg is formed with respect to the free end of the second spring arm to transfer the load to the clip sections forming the V generally along such plane perpendicular to the axis of the specimen.

12. The spring clip of claim 1 wherein said spring force reaction member defines a shallow V shaped receptacle opening in a direction toward the means for pivotally mounting, the center of said shallow V lying along said second plane.

13. The spring clip of claim 1 wherein said link leg is offset from and generally parallel to the first plane.

14. The spring clip of claim 1, wherein said second leg of said spring section is prebent into a shape other than straight when it is unloaded, the spring legs tending to be moved toward each other to exert said resilient load when used for attaching an extensometer to a specimen, said second leg bending to be substantially straight when such extensometer is held onto a specimen by said spring clip.

15. The spring clip of claim 2 wherein said spring arm means comprise a pair of spaced arms, a spring base member connecting said spring arms, a second of said spring arms being positioned on an opposite side of the first arm from the clip section, so that when the clip section is engaging a specimen, the second arm is resiliently moved toward the first arm under spring load.

16. The spring clip of claim 15 wherein said second spring arm is prebent to a configuration other than straight, said resilient loading of said second arm when the spring clip is used to hold an extensometer onto a specimen causing said second arm to bend to be substantially straight.

17. The spring clip of claim 16 wherein said spring arms forming said spring arm means lie substantially in a plane perpendicular to the pivot shank.

* * * * *